July 6, 1937.  T. H. SCHOEPF ET AL  2,085,871
MAGNETIC TRACK BRAKE SYSTEM
Filed Feb. 3, 1936
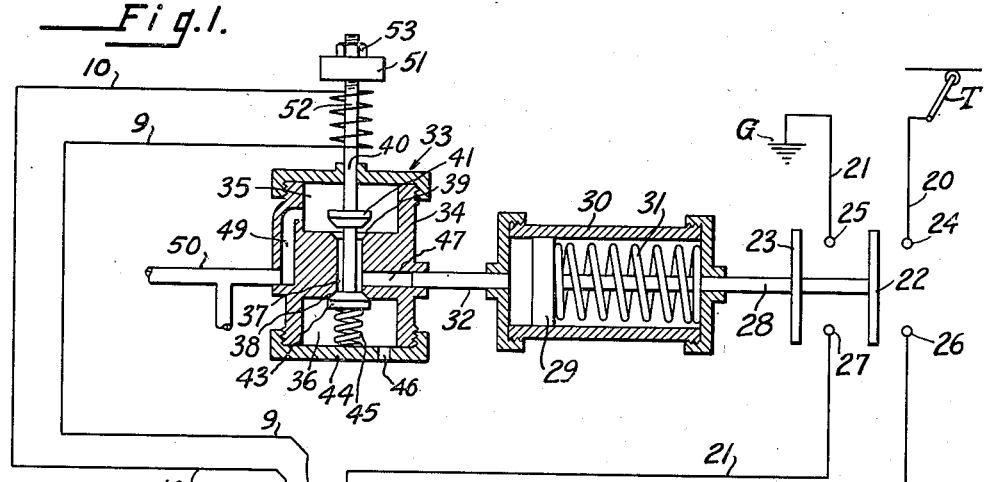
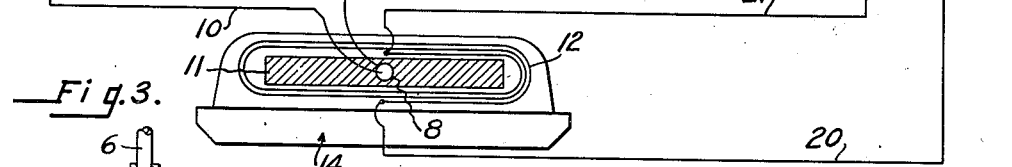
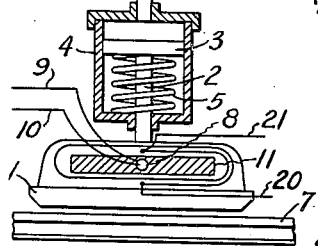
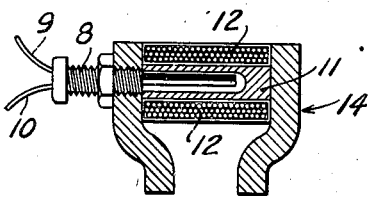
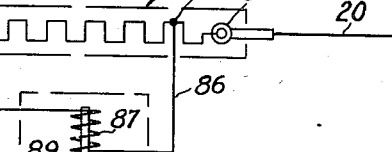
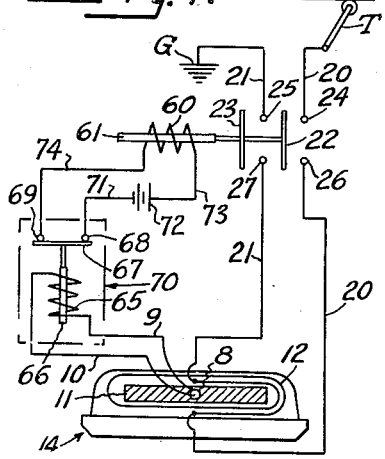
INVENTORS
THEODORE H. SCHOEPF,
BY DAVID M. RITCHIE.
ATTORNEYS Patented July 6, 1937

2,085,871

UNITED STATES PATENT OFFICE 2,085,871

MAGNETIC TRACK BRAKE SYSTEM

Theodore H. Schoepf and David M. Ritchie, Cincinnati, Ohio, assignors to The Cincinnati Traction Building Co., Cincinnati, Ohio, a corporation of Ohio Application February 3, 1936, Serial No. 62,126

19 Claims. (Cl. 188—165)

Our invention relates to magnetic brakes.

It is an object of our invention to provide means whereby to prevent damage and/or destruction of the coils of magnetic brakes, due to the generation of excessive heat therein.

It is an object of our invention to provide means whereby to prevent damage to the coils due to energization thereof, after the braking operation has been performed by the brakes.

It is a further object of our invention to provide means responsive to the heat of the brake shoe coils, whereby to interrupt the energizing circuit therefor when a predetermined temperature is reached.

It is a further object of our invention to provide such means which will be responsive both to the heat generated by the energization of the coils and also responsive to the heat generated therein by the friction between the brake shoe and the rail during the braking operation.

It is a further object of our invention to provide such means whereby the air supply of the brake-supporting vehicle is utilized to provide motive means for interrupting the energizing circuit of the brakes.

It is a further object to provide such means whereby the energizing circuit interrupting means is actuated by the power in the brake-energizing circuit.

It is a further object of our invention to provide means whereby to prevent energization of the brake shoe coils in a magnetic braking system after the braking operation has been completed and the vehicle to which the brakes are attached has come to rest, whereby to provide utmost power economy and long life of the brake shoes.

These and other advantages will appear from the following description taken in connection with the drawing, in which there are described and shown illustrative embodiments of this invention.

Referring to the drawing:

Figure 1 is a diagrammatic view of typical structure which may be used in the practice of our invention;

Figure 2 is a sectional view of the shoe of a magnetic brake having a heat-responsive mechanism inserted in the core thereof according to one practice of our invention;

Figure 3 is a side elevation, partly in section, showing a magnetic brake shoe and a preferred form of supporting and actuating means therefor;

Figure 4 is a diagrammatic view similar to Figure 1, but showing a different form of means for operating the brake-energizing circuit interrupter; and Figure 5 is a diagrammatic view similar to Figure 1, in which there is illustrated additional means for carrying out the practice of our invention.

Referring to the drawing in detail, as shown in Figure 3, the brake shoe 1 is preferably supported and actuated by the rod 2 having thereon a piston 3, which is supported for reciprocation in the cylinder 4 and normally urged upwardly therein by the spring 5 and adapted to be operated by the force of air introduced through inlet 6 into the cylinder to oppose and overbalance the force of the spring 5. By this means, the brake shoe may be urged downwardly against the rail 7 to perform the braking function and there is also shown in Figure 3 a thermocouple or other desirable heat-responsive element inserted preferably in the coils or core of the brake shoe magnet and connected by means of wires 9 and 10 to suitable mechanism for carrying out the purpose of our invention.

With reference particularly to Figures 1 and 2, we have shown heat-responsive means comprising the thermocouple 8 inserted in the core 11 of the brake magnet, which magnet includes the coils 12, as shown particularly in Figures 1 and 2. The brake shoe is generally designated 14 in Figures 1 and 2. As shown in Figure 1, the brake-energizing circuit comprises line 20 leading from the trolley T to one pole of the brake magnet coil 12 and a second line 21 leading from the other pole of the magnet coil 12 to the ground G. The line 20 and the line 21 respectively may be opened and closed by the switch blade or disk 22, which cooperates with contacts 24 and 26 in the line 20 for that purpose and switch blade or disk 23, which cooperates with contacts 25 and 27 in the line 21 for that purpose. The switch blades 22 and 23 are spacedly and integrally attached at one end of the rod 28, which has on the other end thereof piston 29 slidably mounted in the cylinder 30 and urged toward the contact-breaking position (left as seen in Figure 1) by spring 31 and adapted to be urged in the opposite or line-closing position by air introduced through the pipe 32 into the cylinder 30. Air is introduced through the pipe 32 into the cylinder 30 from an electro-responsive valve member, generally designated 33.

The electro-responsive valve 33 comprises a body casting 34 having formed therein a top chamber 35 and a bottom chamber 36 connected by a bore 37 having at the top thereof, adjacent the top chamber 35, a seat 39 and at the bottom end thereof, adjacent the bottom chamber 36, a seat 38. Mounted for reciprocation in the bore 37 is a stem 40 having secured thereto in spaced relation a valve member 41 adapted to cooperate with the seat 39 to close the bore 37 and the chamber 35 and a valve member 43 adapted to close the lower end of the bore 37 at its entrance to the bottom chamber 36. The bottom of the valve body 34 has thereon a cap 44 which supports the spring 45 in the chamber 36 in such a manner that the spring 45 will normally urge the stem 40 upwardly and seat the valve member 43 on the seat 38. The cap 44 has an outlet port 46 therein, which connects the bottom chamber 36 with the atmosphere. Leading from the bore 37 in the central part of the valve body casting 34 is a bore 47 adapted to receive the pipe 32 in order to connect the bore or bore chamber 37 of the valve with the interior of the cylinder 30. Disposed in one side of the body casting 34 is an inlet chamber 49, leading at its upper end into the top chamber 35 and having the conduit 50 inserted in its lower end. The conduit 50 is connected to any suitable constant source of fluid supply.

Screw-threaded on the stem 40 of the valve for lengthwise adjustment thereon is the armature member 51 of a solenoid 52, which has its coils disposed about the stem 40, as shown in Figure 1. Also screw-threaded on the stem 40 is the lock nut 53, which serves to lock the armature member 51 in adjusted position on the stem 40. By means of the adjustment of member 51 on the stem 40, the air gap of the solenoid may be adjusted to operate over a range of current variations responsive to different temperatures of the thermo-electric couple 8, which is connected to the solenoid coil 52 by the wires or leads 9 and 10, described above.

*Operation*

In the normal position for energization of the brake magnet, the position of the valve parts is that shown in Figure 1, wherein air enters from the conduit 50, connected to a constant source of air supply, through the inlet chamber 49 into the top valve chamber 35 and thence through the bore or bore chamber 37 into the bore 47 and through pipe 32 into the interior of the cylinder 30, whereby the piston 29 is constantly urged to the right, as seen in Figure 1, by the constant fluid pressure which overbalances the spring 31, and the switch blades or disks 22 and 23 carried on the rod 28 are then disposed against the respective contacts 24 and 26, and 25 and 27 of the lines 20 and 21, whereby to close these lines and thus cause energization of the coil 12 of the brake magnet.

After the energized brake shoes have been forced down against the rails and the vehicle, to which the brake shoes are attached, has been brought to a stop, the temperature of the magnet coils will be considerable due to the power consumed therein in the energization of the magnets and also due to the heat of friction which is conducted to the coils. The thermoelectric couple 8, in responding to the rise in temperature of the core of the magnet, produces a current which energizes the coil 52 of the solenoid of the electro-responsive valve 33, whereby to force the stem 40 downwardly and seat the valve member 41 on its seat 39, thus closing off the supply of air from the top chamber 35 to the bore chamber 37 and, as will be obvious, the valve member 43 will be unseated, thus allowing fluid to escape from the cylinder 30 through pipe 32 and bore 47 into bore chamber 37 and thence through bottom chamber 36 and port 46 to the atmosphere. This removes opposition to the force of spring 31 and allows this spring to force the piston 29 to the left of cylinder 30, as seen in Figure 1, whereby to withdraw switch blades or plates 22 and 23 from the contacts 24, 26 and 25, 27 respectively, whereby to interrupt the energizing circuit and thus prevent damage to the brake magnets.

While we have disclosed the use of a thermocouple disposed in the core of the brake magnet, it is to be understood that we may, when desired, insert this device or its equivalent directly within the coil windings or in any other desirable position, adjacent the source of heat generation. While we have disclosed a thermocouple, it is to be understood that any other suitable thermostatic switch-operating mechanism may be substituted therefor in the practice of our invention and that our disclosure of a thermocouple is merely illustrative and in no wise limiting. Furthermore, where the current generated by such a thermocouple, as illustrated in Figures 1 and 2, is found too weak for satisfactory actuation of an electro-responsive valve member, such as 33, we may insert in the circuit of the lines 9 and 10 a suitable relay to be actuated by the current generated in the thermocouple 8 or its equivalent.

In Figure 4, we have illustrated further apparatus for the practice of our invention, which though similar to that illustrated in Figure 1, differs therefrom in the substitution of a solenoid means for actuating the switch disks or blades 22 and 23 to close the circuit in the lines 20 and 21 and the further substitution of a relay for actuation of the solenoid, which relay, as pointed out above, may be inserted in the circuit of lines 9 and 10 of Figure 1. As illustrated in Figure 4, the switch blades or disks 22 and 23 are carried by the armature 61 of the solenoid 60, which operates in the same manner as the piston 29 of Figure 1 to open and close the circuit between contacts 24, 26 and 25, 27 respectively, in the lines 20 and 21. The wires 9 and 10 are connected to the solenoid 65 for energization thereof. The solenoid 65 forms a part of the relay, generally designated 70. The relay solenoid 65 has an armature 66, which carries a switch blade or disk 67, adapted upon energization of the relay solenoid 65, to cooperate with contacts 68 and 69 to complete the circuit therethrough. Leading from the relay contact 68 is a wire 71, which is attached to one pole of an electric battery or other source of electric power 72, the other pole of which has a wire 73 attached thereto. The wire 73 leads to one end of the coil of the switch-actuating solenoid 60, which coil has its other end connected by means of the wire 74 to the relay contact 69. The other elements disclosed in Figure 4 have been described above.

*Operation*

In the normal position of the parts shown in Figure 4 for energization of the brake magnets, the armature 61 is so disposed that the switch disk or blade 22 completes the circuit in the line 20 through contacts 24 and 26, and the switch disk or blade 23 completes the circuit in the line 21 between the contacts 25 and 27, and the path of the current is then from the trolley T through line 20 to contact 24 through switch blade 22 to contact 26 and thence through line 29 to the coil 12 and then from the coil 12 through line 21 to contact 27, through switch blade 23 to contact 25 and then through line 21 to ground G. When, under the circumstances explained above, the temperature in the brake magnet reaches a predetermined degree, sufficient current is generated in the thermocouple 8 to actuate the relay solenoid 65 in traveling through the wires 9 and 10. Upon energization of the relay solenoid 65, the armature 66 is moved upwardly, as seen in Figure 4, to such a position as to bring the switch blade or disk 67 against relay contacts 68 and 69, as shown. The circuit for energizing the solenoid 60 is then completed and the power from the electric battery or other source 72 travels through the wire 73 to and through the coil of the solenoid 60 and thence through wire 74 to contact 69. From contact 69, the current flows through switch blade or disk 67 to contact 68 and thence through wire 71 back to the source 72. Upon energization of the solenoid 60, the armature 61 is drawn to the left into the position shown in Figure 4, whereby the switch disk or blade 22 is moved away from contacts 24 and 26, and the switch blade or disk 23 is moved away from contacts 25 and 27, and the lines 20 and 21, respectively, are opened, thus preventing heating of the brake magnets above a predetermined degree. It is, of course, understood that other heat-responsive switch means may be substituted for the thermocouple 8, as pointed out above in the description of Figure 1, and it is also to be understood that, where the current generated by the thermocouple 8 is sufficient to energize the switch solenoid 60, the relay 70 may be omitted. It is to be understood that the solenoids and switch-operating mechanisms shown are illustrative, and that equivalent, mechanical or other means may be used in the same relation to perform the same function, and it is to be understood that solenoids of widely varying operating characteristics may be used and such means, as springs, dashpots, counterweights and the like, may be used to control the operating characteristics thereof, as may be desired.

In Figure 5, we have illustrated another means by which our invention may be carried out, and with particular reference to that figure, it will be seen that the means comprises broadly a shunt, indicated generally at 80, connected in the brake shoe magnet energizing circuit, which shunt in combination with a relay and power switch device will interrupt the current flow through the line 20 of the energizing circuit, which line 20 leads from the trolley T to a connection of the coil 12 of the magnet of the brake shoe 14, the coil 12 being connected by a second line 21 to the ground G.

Referring to Figure 5 in detail, the shunt, generally designated 80, is connected in the line 20 of the brake shoe magnet energizing circuit 20, 21. The intermediate terminals 83 and 84 of the shunt 80 are connected by wires 85 and 86 respectively to the solenoid 87 of a suitable relay, indicated in general as 88. The relay 88 has, in addition to solenoid 87, an armature and stem 89, having attached at the lower end thereof a switch blade or disk 90, adapted to connect and disconnect the circuit between terminals 91 and 92. Terminal 91 is connected by wire 98 to a solenoid 96, which has the other end thereof connected by wire 95 to one terminal of a battery or other source of electrical power 94. The other terminal of 94 is connected by wire 93 to the terminal 92. The solenoid is a part of a power switch device, generally designated 97. The solenoid 96 has an armature and stem 99, one end of which stem is connected to the switch arm 100. The switch arm 100 is pivoted at 101 and carries at the other end thereof a butt contact 102. A second butt contact 103 is fixed and has connected thereto a blow-out coil 104, which is connected to the contact 106 in the line 20. The butt contact 102 is connected by the wire 105 to the contact 107, to which contact 107 is connected a second branch of the line 20, to which line 20 is attached the terminal 82 of the shunt 80. As described above, the terminal 81 of the shunt 80 is connected to a third branch of the line 20, which leads to the coil 12 of the brake magnet. The operation of the device is as follows: in the normal operating position of the parts, wherein solenoids 87 and 96 are not energized, the switch blade or disk 90 is out of contact with terminals 91 and 92, whereby the energizing circuit comprising wires 93, 94, 95 and 98 of the solenoid 96 is opened, then the solenoid 96 is inactive and the switch arm 100 is in such position that the butt contacts 102 and 103 are disposed together. The path of the circuit is then from the trolley through the line 20 to contact 106, through blow-out coil 104, through butt contacts 103, 102, wire 105, contact 107 and the second branch of line 20 to contact 82, and then through the third branch of line 20 to coil 12 of the brake shoe magnet and thence from the coil 12 through line 21 to the ground G.

Under certain conditions, which will be hereinafter pointed out, the solenoid 87 of the relay 88 is energized, whereby the switch blade or disk 90 is brought against contacts 91 and 92, thus closing the energizing circuit for solenoid 96, which solenoid then draws the armature and stem 99 upwardly, as seen in Figure 5, thus swinging the switch arm 100 upwardly about its pivot 101, whereby to separate butt contacts 102 and 103. Separation of these butt contacts 102 and 103 results, as may be clearly seen in Figure 5, in breaking the circuit between the first branch of the line 20, which is connected to the trolley T and the second branch of the line 20, which is connected to the terminal 82. This opens the energizing circuit for the brake shoe magnet coil 12, whereby to prevent damage or destruction thereof due to overheating under the conditions pointed out in detail above. The shunt 80 is preferably to be composed of a suitable material, so that the concrete ohmic resistance between the intermediate terminals 83 and 84 may be predetermined from the formula:

$$R_t = R_1[1 + \alpha_1(t - t_1)]$$

$R_t$ is ohmic resistance at any temperature, $t$ degrees. $R_1$ is ohmic resistance at any temperature, $t_1$ degrees. $\alpha_1$ is temperature coefficient of resistance over the limited range met with in practice.

With that knowledge, the relay 88 may be selected or designed to have suitable operative characteristics to effect the opening of the energizing circuit 20, 21 at butt contacts 102 and 103, as pointed out above. The relay 88 may have suitable characteristics to enable it to function and effect said opening of the butt contacts 102 and 103 after a predetermined lapse of time, instantaneously upon the flow of current of predetermined value in shunt 80, upon the temperature of the resistance between terminals 81 and 82 attaining a predetermined value, or under any other conditions which may be desired.

Adjustment of the various mechanisms and variation within a wide degree is contemplated, as is the use of spring tension, bellows, or dashpot means, etc. and particularly changes in the nature of, and operative characteristics of, the solenoids, are contemplated, the structure described and illustrated being intended as illustrative and in no wise limiting.

The relay 88 may, for instance, be constructed on the principle of a known electro-dynamometer, wherein the turning effect exerted on the moving coil varies as the square of the current in the energizing circuit, and, since the heat generated in the magnetic coil also varies as the square of the current, this device is particularly adaptable to the inventive concept herein described, and we also contemplate the use of relays constructed on the known hot wire principle, which are particularly suited to and readily adapted for use in our invention.

It will be understood that the above description is illustrative and in no wise limiting and that the structure which may be used in the practice of our invention is susceptible of variation within wide limits and that we desire to comprehend within our invention such modifications as may be necessary to adapt it to varying conditions and uses, and which may be embraced within the claims and the scope of our invention.

Having thus fully described our invention, what we claim as new and desire to secure by Letters Patent, is:

1. In a magnetic track brake system having coil energized brakes, temperature responsive means for preventing the generation of excessive heat in the brake coils by interrupting the coil energizing circuit.

2. In a magnetic track brake system including track shoes, means controlled by the temperature of the shoes for limiting the temperature thereof within a predetermined range by interrupting the brake energizing circuit when said range is exceeded.

3. In a magnetic track brake system including brake shoes, means responsive to the temperature of the brake shoes adapted to arrest the energization of the brake shoes.

4. In a magnetic track brake system including brake shoes, temperature-responsive means in the brake shoes adapted to prevent heating of the shoes above a predetermined temperature by arresting the energization of said shoes when a predetermined temperature is reached.

5. In a magnetic track brake system having a magnetic brake shoe with a core and energizing coil, means responsive to the temperature in the shoe adapted to arrest energization of said shoe to prevent heating of said shoe above a predetermined temperature.

6. In a magnetic track brake system having a magnetic brake shoe with a core and energizing coil, means responsive to the temperature in the core adapted to prevent heating of said core above a predetermined temperature.

7. In a magnetic track brake system having a magnetic brake shoe with a core and energizing coil; means responsive to the temperature in the coil adapted to prevent heating of said coil above a predetermined temperature.

8. In a magnetic track brake system having a magnetic brake shoe with a core, a coil and an energizing circuit for said coil; means responsive to the temperature in the coil adapted to open the energizing circuit when a predetermined temperature of the coil is reached.

9. In a magnetic track brake system having a magnetic brake shoe with a core, a coil and an energizing circuit for said coil; means responsive to the temperature in the core adapted to open an energizing circuit when a predetermined temperature of the core is reached.

10. In a magnetic track brake system having a magnetic brake shoe with a core, a coil and an energizing circuit for said coil; means responsive to the temperature in the shoe adapted to open the energizing circuit when a predetermined temperature of the shoe is reached.

11. In a magnetic track brake system including a brake shoe having a core, a coil and an energizing circuit therefor, switch means in said circuit, fluid operated means for operating said switch means, and means responsive to the temperature of said shoe for causing said switch operating means to open said switch means when a predetermined temperature is reached.

12. In a magnetic track brake system including a brake shoe having a core, a coil and an energizing circuit therefor; switch means in said circuit, fluid operated means for operating said switch means, and means responsive to the temperature of said coil for causing said switch operating means to open said switch means when a predetermined temperature is reached.

13. In a magnetic track brake system including a brake shoe having a core, a coil and an energizing circuit therefor; switch means in said circuit, fluid operated means for operating said switch means, and means responsive to the temperature of said core for causing said switch operating means to open said switch means when a predetermined temperature is reached.

14. In a magnetic track brake system including a brake shoe having a core, a coil and an energizing circuit therefor; switch means in said circuit, fluid-operating means for operating said switch means, electro-responsive means for controlling said switch-operating means, and means responsive to the temperature of said shoe for operating said electro-responsive means to cause fluid-operated means to open said switch means when a predetermined temperature is reached.

15. In a magnetic track brake system including a brake shoe having a core, a coil, and an energizing circuit therefor; switch means in said circuit, fluid-operated means for operating said switch means, electro-responsive means for controlling said switch-operating means, and means responsive to the temperature of said coil for operating said electro-responsive means to cause said fluid-operated means to open said switch means when a predetermined temperature is reached.

16. In a magnetic track brake system including a brake shoe having a core, a coil and an energizing circuit therefore; switch means in said circuit, fluid-operated means for operating said switch means, electro-responsive means for controlling said switch-operating means, and means responsive to the temperature of said core for operating said electro-responsive means to cause said fluid-operated means to open said switch means when a predetermined temperature is reached, whereby to limit the temperature of said brake shoe.

17. In a track brake system including a brake shoe having a core, a coil, and an energizing circuit therefor; switch means in said circuit, fluid-operated means for operating said switch means, electro-responsive means for controlling said switch-operating means, relay means for controlling said electro-responsive means, and means responsive to the temperature of said shoe for causing said electro-responsive means to operate said fluid-operated means to open said switch means and arrest the energization of the brake shoe coil when a predetermined temperature is reached, whereby to limit the temperature of said brake shoe.

18. In a track brake system including a brake shoe having a core, a coil, and an energizing circuit therefor; switch means in said circuit, fluid-operated means for operating said switch means, electro-responsive means for controlling said switch-operating means, relay means for controlling said electro-responsive means, and thermocouple means in said shoe for causing said electro-responsive means to operate said fluid-operated means to open said switch means and arrest the energization of the brake shoe coil when a predetermined temperature is reached, whereby to limit the temperature of said brake shoe.

19. In a mechanism for arresting the energization of a magnetic track brake coil by interrupting the energizing circuit thereof, heat-responsive means adjacent said coil adapted to cause said circuit to be interrupted, said heat-responsive means comprising a thermocouple.

THEODORE H. SCHOEPF.
DAVID M. RITCHIE.

DISCLAIMER 2,085,871.—*Theodore H. Schoepf* and *David M. Ritchie*, Cincinnati, Ohio. MAGNETIC TRACK BRAKE SYSTEM. Patent dated July 6, 1937. Disclaimer filed October 21, 1939, by the assignee, *The Westinghouse Air Brake Company*.

Hereby enters this disclaimer to claim 1 of said patent.

[*Official Gazette November 14, 1939.*]